United States Patent
Chen et al.

(10) Patent No.: US 10,547,868 B2
(45) Date of Patent: Jan. 28, 2020

(54) METHOD AND DEVICE FOR ENCODING AND DECODING INFORMATION INDICATING INTRA SKIP MODE PREDICTION METHOD

(71) Applicant: SAMSUNG ELECTRONICS CO., LTD., Suwon-si (KR)

(72) Inventors: Jie Chen, Beijing (CN); Jin-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/772,978

(22) PCT Filed: Nov. 17, 2016

(86) PCT No.: PCT/KR2016/013240
§ 371 (c)(1),
(2) Date: May 2, 2018

(87) PCT Pub. No.: WO2017/099385
PCT Pub. Date: Jun. 15, 2017

(65) Prior Publication Data
US 2018/0324460 A1    Nov. 8, 2018

(30) Foreign Application Priority Data

Dec. 11, 2015 (CN) .......................... 2015 1 0920963
Nov. 11, 2016 (KR) ........................ 10-2016-0150334

(51) Int. Cl.
*H04N 19/593*    (2014.01)
*H04N 19/132*    (2014.01)
(Continued)

(52) U.S. Cl.
CPC ......... *H04N 19/593* (2014.11); *H04N 19/132* (2014.11); *H04N 19/176* (2014.11); *H04N 19/184* (2014.11)

(58) Field of Classification Search
CPC .. H04N 19/147; H04N 19/176; H04N 19/187; H04N 19/11
(Continued)

(56) References Cited

U.S. PATENT DOCUMENTS 9,445,098 B2    9/2016    Kim et al.
9,451,260 B2    9/2016    Seregin et al.
(Continued)

FOREIGN PATENT DOCUMENTS

KR    10-2010-0033676 A    3/2010
KR    10-2013-0002286 A    1/2013
(Continued)

OTHER PUBLICATIONS

International Search Report dated Feb. 21, 2017, issued by the International Searching Authority in counterpart International Patent Application No. PCT/KR2016/013240 (PCT/ISA/210).
(Continued)

*Primary Examiner* — Anand S Rao
(74) *Attorney, Agent, or Firm* — Sughrue Mion, PLLC

(57) ABSTRACT

Provided are a method and apparatus for encoding and decoding a video. A method of decoding a video according to an embodiment includes: determining an intra-prediction method of at least one neighboring block adjacent to a current block that uses an intra-skip mode; determining priority levels of candidate intra-prediction methods of the intra-skip mode for the current block according to the intra-prediction method of the at least one neighboring block and aligning the candidate intra-prediction methods according to the priority levels; obtaining, from a bitstream, index
(Continued)

information indicating one of the candidate intra-prediction methods; determining a candidate intra-prediction method indicated by the obtained index information from among the aligned candidate intra-prediction methods as an intra-prediction method of the current block; and decoding the current block by using the determined intra-prediction method.

9 Claims, 3 Drawing Sheets

(51) Int. Cl.
 *H04N 19/184* (2014.01)
 *H04N 19/176* (2014.01)
(58) Field of Classification Search
 USPC .................................... 375/240.11–240.29
 See application file for complete search history.

(56) References Cited

U.S. PATENT DOCUMENTS

| | | | |
|---|---|---|---|
| 9,491,458 B2 * | 11/2016 | Tu | ........................ H04N 19/105 |
| 2014/0153646 A1 | 6/2014 | Yang et al. | |
| 2016/0044310 A1 | 2/2016 | Park et al. | |

FOREIGN PATENT DOCUMENTS

| | | |
|---|---|---|
| KR | 10-2013-0004548 A | 1/2013 |
| KR | 10-2013-0072154 A | 7/2013 |
| KR | 10-2014-0098054 A | 8/2014 |

OTHER PUBLICATIONS

Written Opinion dated Feb. 21, 2017, issued by the International Searching Authority in counterpart International Patent Application No. PCT/KR2016/013240 (PCT/ISA/237).

* cited by examiner

METHOD AND DEVICE FOR ENCODING AND DECODING INFORMATION INDICATING INTRA SKIP MODE PREDICTION METHOD

TECHNICAL FIELD

The present disclosure relates to video encoding and decoding, and more particularly, to encoding and decoding of information indicating a prediction method of an intra-skip mode.

BACKGROUND ART

In three dimensional-high efficiency video coding (3D-HEVC), which is latest recent international standard for 3D video coding, an intra-frame skip mode is used as a coding technology for depth image coding. Intra-prediction includes predicting a pixel in a current coding block by using reconstruction values of other pixels that are spatially adjacent to the current coding block. The adjacent pixels used for prediction and the pixel in the current block that is to be predicted are in the same image frame, and thus this method is called intra-prediction. In a conventional intra-coding mode, a difference between a predicted pixel value after intra-prediction and an original pixel value may be calculated, and then encoded into a video bitstream that is transmitted to a decoder. Also, the decoder may add the difference to the predicted pixel value obtained by performing the same intra-prediction, so as to obtain a reconstructed pixel value. An intra-skip mode of 3D-HEVC also performs intra-prediction. However, in the intra-skip mode, after the intra-prediction, a reconstructed pixel value may be directly set to a predicted pixel value and other information in a bitstream may not be transmitted. Also, compared to an original value before coding, the reconstructed value may have a certain distortion due to the lack of compensation using a difference. However, since the difference is not transmitted in the bitstream, coding compression efficiency may be improved. A depth image includes a plurality of flat blocks. Since a difference between an original value of a pixel in a flat block and a predicted value obtained by using pixels adjacent to the pixel is so small that distortion of a reconstructed value is also very small even when the difference is not transmitted. Therefore, an intra-skip mode is used for depth image coding in 3D-HEVC.

Intra-prediction may provide many prediction methods such as a vertical method, a horizontal method, and a right-down diagonal method. When it is determined to encode a current block by using an intra-skip mode, an encoder still needs to select an intra-prediction method to be used. Next, the encoder may transmit information of the intra-prediction method in a bitstream so that a decoder knows the intra-prediction method to be used when decoding the current block.

In 3D-HEVC, a flag may be fixedly transmitted in a bitstream to indicate whether a current block is coded in an intra-skip mode. When the block is coded in the intra-skip mode, an index is transmitted subsequently to indicate an intra-prediction method. The index is fixedly associated with the intra-prediction method. Specifically, an encoder and a decoder may determine a common order of all supported intra-prediction methods, and the encoder may transmit an index of an intra-prediction method used in the decoder. The order of the intra-prediction methods is not changed, i.e., the same intra-prediction method is always associated with the same index value.

DESCRIPTION OF EMBODIMENTS

Technical Problem

Provided are a method and apparatus for encoding and decoding information indicating an intra-prediction method of an intra-skip mode.

Advantageous Effects of Disclosure

Since a method and apparatus for encoding/decoding a video according to an embodiment uses an intra-prediction method of neighboring blocks adjacent to a current block to encode/decode index information indicating an intra-prediction method of the current block that uses an intra-skip mode, transmission efficiency in the intra-skip mode may be improved.

BEST MODE

Figure 1:
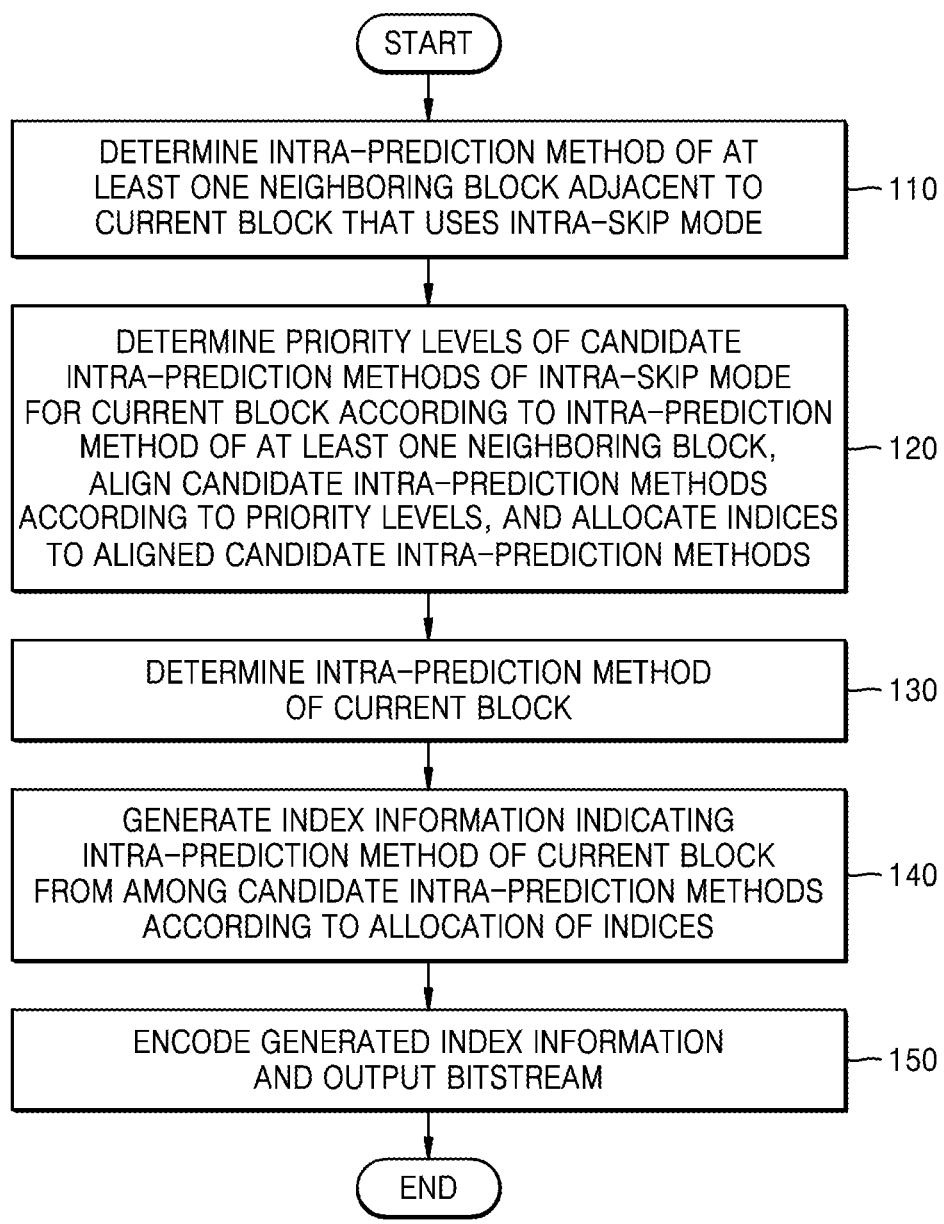
FIG. 1 is a flowchart of a method of encoding a video according to an embodiment.

A method of decoding a video according to an embodiment may include: determining an intra-prediction method of at least one neighboring block adjacent to a current block that uses an intra-skip mode; determining priority levels of candidate intra-prediction methods of the intra-skip mode for the current block according to the intra-prediction method of the at least one neighboring block and aligning the candidate intra-prediction methods according to the priority levels; obtaining, from a bitstream, index information indicating one of the candidate intra-prediction methods; determining a candidate intra-prediction method indicated by the obtained index information from among the aligned candidate intra-prediction methods as an intra-prediction method of the current block; and decoding the current block by using the determined intra-prediction method.

According to an embodiment, the aligning of the candidate intra-prediction methods according to the priority levels may include aligning the candidate intra-prediction methods in a descending order of the priority levels, wherein codewords indicating the candidate intra-prediction methods aligned in the descending order of the priority levels are an ascending order of codeword lengths.

According to an embodiment, the determining of the priority levels of the candidate intra-prediction methods of the intra-skip mode for the current block may include determining that a candidate intra-prediction method having a higher probability to be used by the current block has a higher priority level.

According to an embodiment, the determining of the priority levels of the candidate intra-prediction methods of the intra-skip mode for the current block may include determining that a candidate intra-prediction method used by the at least one neighboring block has a priority level higher than a priority level of a candidate intra-prediction method not used by the at least one neighboring block.

According to an embodiment, the determining of the priority levels of the candidate intra-prediction methods of the intra-skip mode for the current block may include determining that a candidate intra-prediction method not used by the at least one neighboring block and included in a predetermined group in which a candidate intra-prediction method used by the at least one neighboring block is included has a priority level lower than a priority level of an intra-prediction method used by the at least one neighboring block and higher than a priority level of a candidate intra-prediction method not included in the predetermined group.

According to an embodiment, the aligning of the candidate intra-prediction methods according to the priority levels may include aligning candidate intra-prediction methods having a same priority level according to a pre-determined order.

According to an embodiment, the index information may include indices indicating the candidate intra-prediction methods and a predetermined index, other than the indices, and indicates whether the current block uses the intra-skip mode, wherein the method further comprises determining whether the current block uses the intra-skip mode according to the index information obtained from the bitstream.

According to an embodiment, the at least one neighboring block adjacent to the current block may include at least one from among a block spatially adjacent to the current block; a block temporally adjacent to the current block; when the current block is in a dependent view frame, a block located at a same position as the current block in a base view frame corresponding to the dependent view frame; and when the current block is in a depth map frame, a block located at a same position as the current block in a texture frame corresponding to the depth map frame.

According to an embodiment, a data unit of the current block may be any one from among a largest coding unit, a largest coding block, a coding unit, a coding block, a prediction unit, a prediction block, a transform unit, and a transform block, and a data unit of the at least one neighboring block may be any one from among a largest coding unit, a largest coding block, a coding unit, a coding block, a prediction unit, a prediction block, a transform unit, a transform block, a motion information storage unit, a motion information storage block, a prediction information storage unit, and a prediction information storage block.

An apparatus for decoding a video according to an embodiment may include: a neighboring block prediction method determiner configured to determine an intra-prediction method of at least one neighboring block adjacent to a current block that uses an intra-skip mode; a candidate intra-prediction method aligner configured to determine priority levels of candidate intra-prediction methods of the intra-skip mode for the current block according to the intra-prediction method of the at least one neighboring block, and align the candidate intra-prediction methods according to the priority levels; an index information obtainer configured to obtain, from a bitstream, index information indicating one of the candidate intra-prediction methods; and a decoder configured to determine a candidate intra-prediction method indicated by the obtained index information from among the aligned candidate intra-prediction methods as an intra-prediction method of the current block and decode the current block by using the determined intra-prediction method.

A method of encoding a video according to an embodiment may include: determining an intra-prediction method of at least one neighboring block adjacent to a current block that uses an intra-skip mode; determining priority levels of candidate intra-prediction methods of the intra-skip mode for the current block according to the intra-prediction method of the at least one neighboring block, aligning the candidate intra-prediction methods according to the priority levels, and allocating indices to the aligned candidate intra-prediction methods; determining an intra-prediction method of the current block; generating index information indicating the intra-prediction method of the current block from among the candidate intra-prediction methods according to the allocation of the indices; and encoding the generated index information and outputting a bitstream.

MODE OF DISCLOSURE

The use of an index of an intra-prediction method in an intra-skip mode of three dimensional (3D)-high efficiency video coding (HEVC) is simple but has low efficiency as described above. In a coding process, shorter codewords are applied to symbols with higher occurrence probabilities while longer codewords are applied to symbols with lower occurrence probabilities, and thus an average length of codewords of coding may be minimized. In 3D-HEVC, intra-prediction methods in an intra-skip mode are arranged in a fixed order, and indices of the intra-prediction methods are also fixed. In fact, a video signal is a non-stationary signal, and an occurrence probability of each prediction method may be changed. For example, a first prediction method may occur more frequently sometimes and a second prediction method may occur more frequently sometimes. Thus, it is low efficient to specify an intra-prediction method by transmitting a fixed codeword. Based on the above analysis, during an encoding/decoding process of the present disclosure, an intra-prediction method of a neighboring block adjacent to a current block is used to determine a priority level of each intra-prediction method. The term 'priority level' may indicate an occurrence probability of a prediction method that may be changed in real time during a video coding process, and may be used to align the prediction method and dynamically allocate an index to the prediction method. A shorter codeword may be allocated to a prediction method that has a relatively high real-time occurrence probability, and a longer codeword may be allocated to a prediction method that has a relatively low real-time occurrence probability, thereby improving coding efficiency.

In various embodiments of the present disclosure, image data of a video may be divided into a plurality of data units and may be encoded/decoded according to the data units. Each data unit may have a square shape or a rectangular shape, or any arbitrary geometrical shape. The data unit is not limited to a data unit having a predetermined size. For convenience of explanation, a video encoding/decoding technique on a 'block' that is a data unit will now be described. However, a video encoding/decoding technique according to various embodiments should not be limited only to a video encoding/decoding technique on a 'block' and may be applied to various data units.

Various embodiments of the present disclosure will now be described with reference to the drawings.

FIG. 1 is a flowchart of a method of encoding a video according to an embodiment. As shown in FIG. 1, the method may include operations 110 through 150.

In operation 110, an intra-prediction method of at least one neighboring block adjacent to a current block that uses an intra-skip mode is determined.

In operation 120, priority levels of candidate intra-prediction methods of the intra-skip mode are determined for the current block according to the intra-prediction method of the at least one neighboring block, the candidate intra-prediction methods are aligned according to the priority levels, and indices are allocated to the aligned candidate intra-prediction methods.

According to an embodiment, when the candidate intra-prediction methods are aligned, the candidate intra-prediction methods may be aligned according to occurrence probabilities each of the candidate intra-prediction methods for the current block. An occurrence probability of each intra-prediction method may be indicated with a priority level of the intra-prediction method. It is highly probable that the current block adopts the same prediction method as the at least one neighboring block adjacent to the current block, and the intra-prediction method of the at least one neighboring block reflects the occurrence probabilities of each of the candidate intra-prediction methods of the current block. In the present disclosure, the priority levels of the candidate intra-prediction methods in the intra-skip mode of the current block may be determined according to the intra-prediction method of the at least one neighboring block.

According to an embodiment, a candidate intra-prediction method for current block that is the same as the intra-prediction method of the at least one neighboring block may have a higher occurrence probability than that of a candidate intra-prediction method that is different from the intra-prediction method of the at least one neighboring block. An intra-prediction method that is used more times by the at least one neighboring block from among the candidate intra-prediction methods may have a higher occurrence probability than that of an intra-prediction method that is used less times by the at least one neighboring block. When the priority levels of the candidate intra-prediction methods for the current block are determined, a candidate intra-prediction method that is determined to have a higher occurrence probability according to the intra-prediction method of the at least one neighboring block may be determined to have a higher priority level.

After the candidate intra-prediction methods are aligned, the indices may be allocated to the candidate intra-prediction methods according to an order of the aligned intra-prediction methods.

In operations 130 and 140, an intra-prediction method of the current block is determined, and index information indicating the intra-prediction method of the current block from among the candidate intra-prediction methods is generated according to the allocation of the indices.

According to an embodiment, after the indices are allocated in operation 120, codewords may be allocated from short codewords to long codewords to the candidate intra-prediction methods that are aligned in a descending order of the priority levels. For example, when the candidate intra-prediction methods are aligned in the descending order of the priority levels, the short codewords may be first allocated to the candidate intra-prediction methods and then the long codewords may be allocated according to the indices of the prediction methods. Also, when the candidate intra-prediction methods are aligned in an ascending order of the priority levels, the long codewords are first allocated to the candidate intra-prediction methods and then the short codewords are allocated according to the indices of the prediction method. A shorter codeword may be allocated to a candidate intra-prediction method having a higher occurrence probability and a longer codeword may be allocated to a candidate intra-prediction method having a lower occurrence probability, thereby improving coding efficiency of prediction mode information.

In operation 150, the generated index information is encoded and a bitstream is output.

According to an embodiment, information indicating whether the intra-skip mode is used in addition to the index information may be additionally encoded and may be included in the bitstream, or the index information may further indicate whether the current block uses the intra-skip mode by using a predetermined index other than the indices indicating the candidate intra-prediction methods.

Next, the above encoding process may end.

Figure 2:
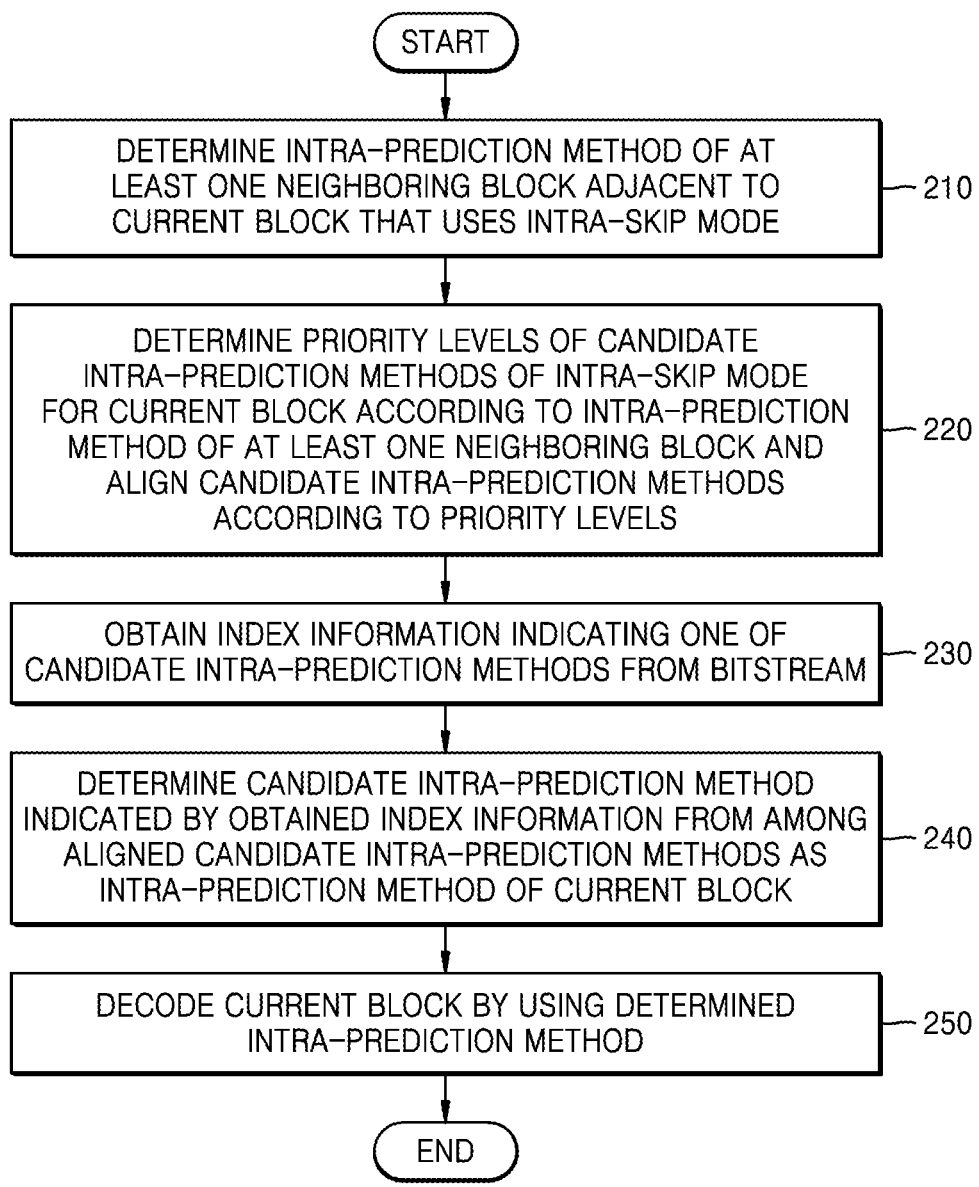
FIG. 2 is a flowchart of a method of decoding a video according to an embodiment.

FIG. 2 is a flowchart of a method of decoding a video according to an embodiment. As shown in FIG. 2, the method may include operations 210 through 250.

In operation 210, an intra-prediction method of at least one neighboring block adjacent to a current block that uses an intra-skip mode is determined.

In operation 220, priority levels of candidate intra-prediction methods of the intra-skip mode for the current block are determined according to the intra-prediction method of the at least one neighboring block, and the candidate intra-prediction methods are aligned according to the priority levels.

In operations 230 through 250, index information indicating one of the candidate intra-prediction methods is obtained, a candidate intra-prediction method indicated by the obtained index information from among the aligned candidate intra-prediction methods is determined as an intra-prediction method of the current block, and the current block is decoded by using the determined intra-prediction method.

According to an embodiment, the candidate intra-prediction method indicated by the obtained index information may be determined through a mapping relation between an index and a candidate intra-prediction method. The mapping relation may be the same as a mapping relation in an encoder.

Next, the above decoding process may end.

According to an embodiment, in the above encoding and decoding processes, the at least one neighboring block adjacent to the current block may be a spatially adjacent block, a temporally adjacent block, a view-adjacent block, or a texture-depth adjacent block. Through the above processes, in order to improve coding efficiency of prediction mode information, occurrence probabilities of the candidate intra-prediction methods of the intra-skip mode may be determined in real time according to the intra-prediction method of the at least one neighboring block, and codewords of the candidate intra-prediction methods may be adaptively adjusted based on the occurrence probabilities. Each of the current block and the at least one neighboring block may be any one, but is not limited to, from among a largest coding unit, a largest coding block, a coding unit, a coding block, a prediction unit, a prediction block, a transform unit, a transform block, a motion information storage unit, a motion information storage block, a prediction information storage unit, and a prediction information storage block. The current block and the at least one neighboring block may be data units of different types.

In the encoding method of the present disclosure, the current block may refer to a block to be encoded or being encoded currently, and the at least one neighboring block may refer to an adjacent block that has been encoded. In the decoding method of the present disclosure, the current block may refer to a block to be decoded or being decoded currently, and the at least one neighboring block may refer to an adjacent block that has been decoded.

Embodiments 1 through 5 of a video encoding method of the present disclosure are described as follows.

Embodiment 1 provides a method of encoding a video.

In the present embodiment, four candidate intra-prediction methods, i.e., a vertical method, a horizontal method, a right-down diagonal method, and a bi-linear method, are available for the intra-skip mode of the current block. An order of the four candidate intra-prediction methods may be pre-determined. For example, the pre-determined order in the present embodiment may be the vertical method, the horizontal method, the right-down diagonal method, and the bi-linear method. The at least one neighboring block of the present embodiment may be at least one block spatially adjacent to the current block. The at least one neighboring block may be a left adjacent block and an upper adjacent block in the same frame as the current block.

In the present embodiment, an intra-prediction method of the at least one neighboring block adjacent to the current block may be determined. An intra-prediction method of each of a left block spatially adjacent to the current block and an upper block spatially adjacent to the current block may be determined.

In the present embodiment, candidate intra-prediction methods of the intra-skip mode of the current block may be aligned, and indices may be allocated to the candidate intra-prediction methods according to the intra-prediction method of the at least one neighboring block.

In the present embodiment, when the candidate intra-prediction methods are aligned, it may be assumed that an occurrence probability of a candidate intra-prediction method that is the same as the intra-prediction method used by the at least one neighboring block is higher than that of a candidate intra-prediction method that is different from the intra-prediction method used by the at least one neighboring block. That is, a candidate intra-prediction method that is the same as the intra-prediction method used by the at least one neighboring block may have a higher priority level.

For example, when a prediction block adjacent to the current block is considered as a neighboring block, all of the candidate intra-prediction methods may be aligned according to an intra-prediction method of the neighboring block. When a left adjacent prediction block and an upper adjacent prediction block include at least one intra-coded prediction block having one of the pre-determined candidate intra-prediction methods as an intra-prediction method, the candidate intra-prediction method may be set to a high priority level, and the other candidate intra-prediction methods are set to a low priority level. Candidate intra-prediction methods having the same priority level may be aligned according to the pre-determined order.

For example, when the upper adjacent prediction block and the left adjacent prediction block use an intra-prediction mode and respectively use the vertical method and the bi-linear method as an intra-prediction method, the vertical method and the bi-linear method may be set to a high priority level, and the horizontal method and the right-down diagonal method may be set to a low priority level. A final order may be the vertical method, the bi-linear method, the horizontal method, and the right-down diagonal method.

Alternatively, when the upper adjacent prediction block and the left adjacent prediction block use an intra-prediction mode and use the horizontal method as an intra-prediction method, or only one of the upper adjacent prediction block and the left adjacent prediction block uses an intra-coding mode and uses the horizontal method as an intra-prediction method, the horizontal method is set to a high priority level, and the vertical method, the right-down diagonal method, and the bi-linear method are set to a low priority level. A final order is the horizontal method, the vertical method, the right-down diagonal method, and the bi-linear method.

Alternatively, when the upper adjacent prediction block and the left adjacent prediction block do not use an intra-prediction mode, or use an intra-prediction mode having an intra-prediction method that is not one of the pre-determined candidate intra-prediction methods, there may be no candidate intra-prediction method having a high priority level, and a final order may be the same as the pre-determined order, i.e., the vertical method, the horizontal method, the right-down diagonal method, and the bi-linear method.

In the present embodiment, after the candidate intra-prediction methods are aligned, indices may be respectively allocated. In an array of the aligned candidate intra-prediction methods, an index d may be allocated to an intra-prediction method A of an intra-skip mode of the current block, index information may be generated, and the generated index information may be encoded to be written into a bitstream.

The index d may be a position of the intra-prediction method A in the array of the aligned candidate intra-prediction methods. A procedure of writing the index information into the bitstream may be writing the index d into the bitstream individually, i.e., first writing information about whether the current block uses the intra-skip mode and then writing an index value. When the candidate intra-prediction methods are aligned in a descending order of priority levels and indices are allocated, a codeword of a larger index value to be written into the bitstream may be longer than a codeword of a smaller index value to be written into the bitstream.

Embodiment 2 provides a method of encoding a video.

In the present embodiment, six candidate intra-prediction methods i.e., a vertical method, a horizontal method, right-down diagonal method, a bi-linear method, a direct current (DC) method, and a plane method, are available for the intra-skip mode of the current block. An order of the six candidate intra-prediction methods may be pre-determined. For example, the pre-determined order in the present embodiment may be the vertical method, the horizontal method, the right-down diagonal method, the bi-linear method, the DC method, and the plane method. The at least one neighboring block of the present embodiment may be at least one neighboring block spatially adjacent to the current block. The at least one neighboring block may be a left adjacent block and an upper adjacent block in the same frame as the current block.

In the present embodiment, an intra-prediction method of the at least one neighboring block adjacent to the current block may be determined. An intra-prediction method of each of a left block spatially adjacent to the current bloc, an upper block adjacent to the current block, and an upper-left block spatially adjacent to the current block may be determined.

In the present embodiment, candidate intra-prediction methods of the intra-skip mode of the current block may be aligned, and indices may be allocated to the candidate intra-prediction methods according to the intra-prediction method of the at least one neighboring block.

In the present embodiment, the aligning rule may be the same as that of embodiment 1.

For example, when a coding block adjacent to the current block is considered as a neighboring block, all of the candidate intra-prediction methods may be aligned according to an intra-prediction method of the neighboring block. When a left adjacent coding block, an upper adjacent coding block, and an upper-left adjacent coding block include at least one intra-coded block having one of the pre-determined candidate intra-prediction methods as an intra-prediction method, the candidate intra-prediction method may be determined to have a high priority level, and the other candidate intra-prediction methods may be determined to have a low priority level. When a neighboring coding block has a plurality of intra-prediction methods, one of the intra-prediction methods may be selected as an intra-prediction method of the neighboring coding block.

For example, an intra-prediction method applied to a pixel adjacent to the current block may be selected as the intra-prediction method of the neighboring block. Candidate intra-prediction methods having the same priority level may be aligned according to the pre-determined order.

For example, when the upper adjacent coding block, the left adjacent coding block, and the upper-left adjacent coding block use an intra-prediction mode and respectively use the horizontal method, the right-down diagonal method, and the DC method as an intra-prediction method, the horizontal method, the right-down diagonal method, and the DC method may be set to a high priority level, and the vertical method, the bi-linear method, and the plane method may be set to a low priority level. A final order is the horizontal method, the right-down diagonal method, the DC method, the vertical method, the bi-linear method, and the plane method.

Alternatively, when only two of the upper adjacent coding block, the left adjacent coding block, and the upper-left coding block use an intra-prediction method and use the vertical method and the bi-linear method as an intra-prediction method, or the three neighboring blocks use an intra-prediction mode but use only two different methods from among the pre-determined intra-prediction methods, that is, the vertical method and the bi-linear method, the vertical method and the bi-linear method may be set to a high priority level, and the horizontal method, the right-down diagonal method, the DC method, and the plane method may be set to a low priority level. A final order may be the vertical method, the bi-linear method, the horizontal method, the right-down diagonal method, the DC method, and the plane method.

Alternatively, when only one of the upper adjacent coding block, the left adjacent coding block, and the upper-left adjacent coding block uses an intra-coding mode and uses the vertical method as an intra-prediction method, or two or three of the neighboring blocks use an intra-coding mode but use only one pre-determined intra-prediction method that is the vertical method, the vertical method may be set to a high priority level, and the horizontal method, the right-down diagonal method, the bi-linear method, the DC method, and the plane method may be set to a low priority level. A final order may be the vertical method, the horizontal method, the right-down diagonal method, the bi-linear method, the DC method, and the plane method.

Alternatively, when the upper adjacent coding block, the left adjacent coding block, and the upper-left adjacent coding block do not use an intra-prediction mode having the pre-determined intra-prediction method of the intra-skip mode as an intra-prediction method, there may be no candidate intra-prediction method having a high priority level, and a final order may be the same as the pre-determined order, i.e., the vertical method, the horizontal method, the right-down diagonal method, the bi-linear method, the DC method, and the plane method.

In the present embodiment, after the candidate intra-prediction methods are aligned, indices may be allocated. An index d may be allocated to an intra-prediction method of the intra-skip mode of the current block from among the aligned candidate intra-prediction methods. Index information about the index d may be generated and encoded, and the encoded index information may be written into a bitstream.

A method of writing the index information into the bitstream may be writing the index information into the bitstream to indicate an intra-prediction method along with whether the current block uses the intra-skip mode. A possible method may include writing zero indicating that the intra-skip mode is not used into the bitstream, and writing a non-zero value indicating that the intra-skip mode is used, that is, a value indicating an index allocated to an intra-prediction method. A value indicating that the intra-skip mode is not used does not need to be zero and may be another value. When indices are represented by values, the values may be allocated to the indices from short values to long values one by one in a descending order of priority levels, so that a shorter codeword may be allocated to an intra-prediction method having a higher occurrence probability and a longer codeword may be allocated to an intra-prediction method having a smaller occurrence probability, thereby improving coding efficiency.

Although neighboring blocks are spatially adjacent blocks in embodiments 1 and 2, the neighboring blocks may be extended to temporally adjacent blocks and view-adjacent blocks, and the spatially adjacent blocks are not limited to a left adjacent block, an upper adjacent block and an upper-left adjacent block.

Embodiment 3 provides a method of encoding a video.

In the present embodiment, n candidate intra-prediction methods are available for the intra-skip mode. An order of the n candidate intra-prediction methods may be pre-determined. For example, the pre-determined order may be $x_1$, $x_2$, ..., and $x_n$. The at least one neighboring block of the present embodiment may include spatially and temporally adjacent blocks. The at least one neighboring block may include a left block spatially adjacent to the current block, an upper block spatially adjacent to the current block, and a block located at the same spatial position as the current block in a frame temporally adjacent to a frame in which the current block is included.

In the present embodiment, an intra-prediction method of the at least one neighboring block adjacent to the current block may be determined. An intra-prediction method of each of a left block, an upper block, and an upper-right block that are spatially adjacent to the current block and a block located at the same spatial position as the current block in a temporally adjacent frame may be determined.

In the present embodiment, candidate intra-prediction methods of the intra-skip mode of the current block may be aligned, and indicates may be allocated to the candidate intra-prediction methods according to the intra-prediction method of the at least one neighboring block.

In the present embodiment, the aligning rule may be the same as the aligning rule of embodiment 1.

All of the candidate intra-prediction methods may be aligned according to the intra-prediction method of the at least one neighboring block. When a left adjacent block, an upper adjacent block, an upper-right adjacent block, and a block located at the same spatial position as the current block in a temporally adjacent frame include an intra-coded block having one of the pre-determined candidate intra-prediction methods of the intra-skip mode in the present embodiment as a prediction method, a candidate intra-prediction method used by the at least one neighboring block may be set to a high priority level and the other candidate intra-prediction methods may be set to a low priority level. Candidate intra-prediction methods having the same priority level may be aligned according to the pre-determined order.

For example, from among the candidate intra-prediction methods $x_1, x_2, \ldots,$ and $x_n$, prediction methods used by the upper adjacent block, the left adjacent block, the upper-right adjacent block, and the block located at the same spatial position as the current block in the temporally adjacent frame may include $x_i, x_j,$ and $x_k$. Then $x_i, x_j,$ and $x_k$ may be set to a high priority level, and the other prediction methods may be set to a low priority level. A final order may be $x_i, x_j, x_k, x_1, x_2, \ldots,$ and $x_n$.

In the present embodiment, after the candidate intra-prediction methods are aligned, indices may be allocated. An index d may be allocated to a prediction method A of the intra-skip mode of the current block from among the aligned candidate intra-prediction methods. Index information about the index d may be generated and encoded, and the encoded index information may be written into a bitstream.

A possible method may be writing the index information into the bitstream to indicate an intra-prediction method along with whether the current block uses the intra-skip mode and other encoded information. In the possible method, a value y+d may be written into the bitstream to indicate that the intra-skip mode is used according to the index d, and a value outside a range of y to y+n−1 may be written to indicate that the intra-skip mode is not used.

Embodiment 4 provides a method of encoding a video.

In the present embodiment, n candidate intra-prediction methods are available for the intra-skip mode. An order of the n candidate intra-prediction methods may be pre-determined. For example, the pre-determined order of the present embodiment may be $x_1, x_2, \ldots,$ and $x_n$. The at least one neighboring block of the present embodiment may include a left adjacent block and an upper adjacent block that are in the same frame as the current block; a block located at the same spatial position as the current block in a temporally adjacent frame; and when the current block is in a dependent view image, as a block located at the same spatial position as the current block in a base view image or a block located at a position shifted by a disparity vector from a position of the current block in the base view image. An intra-prediction method of the at least one neighboring block adjacent to the current block may be determined.

In the present embodiment, candidate intra-prediction methods of the intra-skip mode of the current block may be aligned, and indices may be allocated to the candidate intra-prediction methods according to the intra-prediction method of the at least one neighboring block.

In the present embodiment, when the candidate intra-prediction methods are aligned, an occurrence probability of a candidate intra-prediction method that is used by the at least one neighboring block or similar to the intra-prediction method of the at least one neighboring block may be higher than that of a candidate intra-prediction method that is not used by the at least one neighboring block and is not similar to the intra-prediction method of the at least one neighboring block. A candidate intra-prediction method that is the same as the intra-prediction method used by the at least one neighboring block may have a highest priority level, a candidate intra-prediction method that is similar to the intra-prediction method used by the at least one neighboring block may have a second highest priority level, and the other prediction methods may have a lowest priority level.

Groups may be pre-defined, and prediction methods in the same group may be determined to be similar to each other. For example, groups may be defined in a standard. For example, for angle prediction methods, when two angles are adjacent or a distance between the two angles is less than a specific threshold, the two angles may be determined to be close to each other, i.e., the two angle prediction methods may be similar prediction methods and may be included in the same group. A prediction method that is the same as the intra-prediction method of the at least one neighboring block and a prediction method that is similar to the intra-prediction method of the at least one neighboring block may have a highest priority level.

In the present embodiment, a block may be a prediction unit and a prediction information storage unit, and all of the candidate intra-prediction methods may be aligned according to the intra-prediction method of the at least one neighboring block. When a pre-determined candidate intra-prediction method of the intra-skip mode is used by the at least one neighboring block, the candidate intra-prediction method may be set to a first priority level. When a pre-determined candidate intra-prediction method is different from but similar to the intra-prediction method of the at least one neighboring block, the candidate intra-prediction method may be set to a second priority level. The other candidate intra-prediction methods may be set to a third priority level.

The at least one neighboring block may include a left adjacent prediction unit and an upper adjacent prediction unit that are in the same frame as the current block, and a prediction information storage unit located at the same spatial position as the current block in a temporally adjacent frame. When the current block is in a dependent view image, the at least one neighboring block may also include a prediction information storage unit located at the same spatial position as the current block in a base view image or a prediction information storage unit located at a position shifted from a position of the current block in the base view image.

The intra-prediction method used by the at least one neighboring block may refer to the intra-prediction method that is used by the at least one neighboring block that uses an intra-prediction mode. Candidate intra-prediction methods having the same priority level may be aligned according to the pre-determined order. When a neighboring prediction unit or a prediction information storage unit includes a prediction unit or a prediction information storage unit using $x_l$ and $x_m$ as a prediction method, $x_l$ and $x_m$ may be set to a first priority level. Assuming that A and $x_o$ are adjacent angle prediction methods and B and $x_p$ are angle prediction methods with a distance of 1 therebetween, when a neighboring prediction unit or a prediction information storage unit includes a prediction unit or a prediction information storage unit using A and B as an intra-prediction method, $x_o$ and $x_p$ may be set to a second priority level, and the other prediction methods may be set to a third priority level.

Alternatively, $x_o$ may be set to a second priority level, $x_p$ may be set to a third priority level, and the others may be set to a fourth priority level.

Alternatively, $x_l$ $x_m$, $x_o$, and $x_p$ may all be set to a first priority level, and the others may be set to a second priority level.

The pre-determined n candidate intra-prediction methods may be aligned in a descending order of priority levels, and prediction methods having the same priority level may be aligned according to the pre-determined order.

In the present embodiment, after the candidate intra-prediction methods are aligned, indices may be allocated. An index d may be allocated to a prediction method A of the intra-skip mode of the current block from among the aligned candidate intra-prediction methods. Index information about the index d may be generated and encoded, and the encoded index information may be written into a bitstream.

A procedure of writing the index information into the bitstream may be writing the index d into the bitstream individually, i.e., first writing information about whether the current block uses the intra-skip mode first, and then writing a next index value. When the candidate intra-prediction methods are aligned in a descending order of priority levels and the indices are allocated, a larger index value may be represented by a longer codeword and a smaller index value may be represented by a shorter codeword.

Embodiment 5 provides a method of encoding a video.

In the present embodiment, n candidate intra-prediction methods are available for the intra-skip mode. An order of the n candidate intra-prediction methods may be pre-determined. For example, the pre-determined order of the present embodiment may be $x_1, x_2, \ldots,$ and $x_n$. In the present embodiment, the at least one neighboring block may include a spatially adjacent block, a temporally adjacent block, and a texture-depth adjacent block. The at least one neighboring block may include a left adjacent block and an upper adjacent block in the same frame as the current block, a block located at an upper-left corner of the current block, a block located at the center of the current block in a temporally adjacent frame, and a block located at the same spatial position as the current block in a texture image frame corresponding to a depth image frame when the current block is in the depth image frame.

In the present embodiment, an intra-prediction method of the at least one neighboring block adjacent to the current block may be determined. An intra-prediction method of each of left and upper adjacent blocks in the same frame as the current block, a block located at an upper-left corner of the current block in a temporarily adjacent frame, and a block located at the center of the current block may be determined. When the current block is in a depth image, an intra-prediction method of a block located at the same spatial position as the current block in a corresponding texture image may also be determined.

In the present embodiment, candidate intra-prediction methods of the intra-skip mode of the current block may be aligned, and indices may be allocated to the candidate intra-prediction methods according to the intra-prediction method of the at least one neighboring block.

In the present embodiment, when the candidate intra-prediction methods are aligned, it may be assumed that a candidate intra-prediction method that is used by more neighboring blocks has a higher occurrence probability. That is, when the candidate intra-prediction methods are aligned, a candidate intra-prediction method used by more neighboring blocks may be set to a higher priority level.

In the present embodiment, priority levels may be determined according to the number of neighboring blocks using the candidate intra-prediction methods of the intra-skip mode. A candidate intra-prediction method used by most neighboring blocks may be set to a highest priority level, a candidate intra-prediction method not used by any neighboring blocks may be set to a lowest priority level, and candidate intra-prediction methods having the same priority level may be aligned according to a pre-determined method.

For example, when $x_l$ is used by three neighboring blocks, $x_m$ and $x_k$ are used by one neighboring block, and the other intra-prediction methods are not used by any neighboring blocks, $x_l$ may be set to a first priority level, $x_m$ and $x_k$ may be set to a second priority level, and the other intra-prediction methods may be set to a third priority level. $x_m$ and $x_k$ may be aligned according to the pre-determined order. A final order may be $x_l, x_m, x_k, x_2, \ldots,$ and $x_n$.

In the present embodiment, after the candidate intra-prediction methods are aligned, indices may be allocated. An index d may be allocated to an intra-prediction method A of the intra-skip mode of the current block from among the aligned candidate intra-prediction methods. Index information about the index d may be generated and encoded, and the encoded index information may be written into a bitstream.

A method of writing the index information into the bitstream may be writing the index information into the bitstream to indicate an intra-prediction method along with whether the current block uses the intra-skip mode. A possible method may include writing zero indicating that the intra-skip mode is not used, and writing a non-zero value indicating that the intra-skip mode is used, that is a value indicating an index allocated to an intra-prediction method.

Embodiments 1 through 5 may provide several examples according to a pre-determined order of candidate intra-prediction methods. The pre-determined order may be defined according to needs, and is not limited to the orders provided in the above embodiments.

Embodiments 6 through 10 of a video decoding method of the present disclosure are described as follows.

Embodiment 6 provides a method of decoding a video.

In the present embodiment, four candidate intra-prediction methods, i.e., a vertical method, a horizontal method, a right-down diagonal method, and a bi-linear method, are available for the intra-skip mode. An order of the four candidate intra-prediction methods is pre-determined. For example, the pre-determined order in the present embodiment may be the vertical method, the horizontal method, the right-down diagonal method, and the bi-linear method. The method of the present embodiment may include the following processes.

In the present embodiment, an intra-prediction method of the at least one neighboring block adjacent to the current block may be determined. An intra-prediction method of each of a left prediction block and an upper prediction block that are spatially adjacent to the current block may be determined.

In the present embodiment, candidate intra-prediction methods of the intra-skip mode of the current block may be aligned. This procedure may be the same as that of embodiment 1, and a relation between indices and the candidate intra-prediction methods may be obtained.

For example, when a prediction block adjacent to the current block is considered as a neighboring block, all of the candidate intra-prediction methods may be aligned according to an intra-prediction method of the neighboring block. When a left adjacent prediction block and an upper adjacent prediction block include at least one intra-prediction block having one of the pre-determined candidate intra-prediction methods as an intra-prediction method, the candidate intra-prediction method may be set to a high priority level, and the other candidate intra-prediction methods may be set to a low priority level. Candidate intra-prediction methods having the same priority level may be aligned according to the pre-determined order.

For example, when the upper adjacent prediction block and the left adjacent prediction block use an intra-prediction mode, and respectively use the vertical method and the bi-linear method as an intra-prediction method, the vertical method and the bi-linear method may be set to a high priority level, and the horizontal method and right-down diagonal method may be set to a low priority level. A final order may be the vertical method, the bi-linear method, the horizontal method, and the right-down diagonal method.

Alternatively, when the upper adjacent prediction block and the left adjacent block use an intra-prediction mode and use the horizontal method as an intra-prediction method, or only one of the upper adjacent prediction block and the left adjacent prediction block uses an intra-coding mode and uses the horizontal method as an intra-prediction method, the horizontal method may be set to a high priority level, and the vertical method, the right-down diagonal method, and the bi-linear method may be set to a low priority level. A final order is the horizontal method, the vertical method, the right-down diagonal method, and the bi-linear method.

Alternatively, when the upper adjacent prediction block and the left adjacent prediction block do not use an intra-prediction mode, or the upper adjacent prediction block and the left adjacent prediction block use an intra-prediction mode having an intra-prediction method that is not one of the pre-determined candidate intra-prediction methods, there may be no candidate intra-prediction method having a high priority level, and a final order may be the same as the pre-determined order, i.e., the vertical method, the horizontal method, the right-down diagonal method, and the bi-linear method.

In the present embodiment, index information indicating one of the candidate intra-prediction methods may be obtained by parsing a bitstream. For example, an index d may indicate a candidate intra-prediction method A, and the candidate intra-prediction method A indicated by the obtained index d may be determined as an intra-prediction method of the intra-skip mode of the current block. Decoding of the current block may be performed by using the determined intra-prediction method.

Embodiment 7 provides a method of decoding a video.

In the present embodiment, six candidate intra-prediction methods, i.e., a vertical method, a horizontal method, a right-down diagonal method, a bi-linear method, a DC method, and a plane method, are available for the intra-skip mode of the current block. An order of the six candidate intra-prediction methods may be pre-determined. For example, the pre-determined order in the present embodiment may be the vertical method, the horizontal method, the right-down diagonal method, the bi-linear method, the DC method, and the plane method.

In the present embodiment, an intra-prediction method of the at least one neighboring block adjacent to the current block may be determined. An adjacent coding block may be used as a neighboring block. An intra-prediction method of each of a left coding block, an upper coding block, and an upper-left coding block that are spatially adjacent to the current block may be determined. When an adjacent coding block has a plurality of intra-prediction methods, one of the plurality of intra-prediction methods may be selected as an intra-prediction method of the adjacent coding block. For example, an intra-prediction method used by a pixel adjacent to the current block may be selected as the intra-prediction method of the adjacent coding block.

In the present embodiment, candidate intra-prediction methods of the intra-skip mode of the current block may be aligned. The procedure may be the same as that of embodiment 2 and a relation between indices and the candidate intra-prediction methods may be obtained.

For example, when a coding block adjacent to the current block is considered as a neighboring block, all of the candidate intra-prediction methods may be aligned according to an intra-prediction method of the neighboring block. When a left adjacent coding block, an upper adjacent coding block, and an upper-left adjacent coding block include at least one intra-coded block having one of the pre-determined candidate intra-prediction methods as an intra-prediction method, the candidate intra-prediction method may be set to a high priority level, and the other candidate intra-prediction methods may be set to a low priority level. Candidate intra-prediction methods having the same priority level may be aligned according to the pre-determined order.

For example, when the upper adjacent coding block, the left adjacent coding block, and the upper-left adjacent coding block use an intra-prediction mode and respectively use the horizontal method, the right-down diagonal method, and the DC method as an intra-prediction method, the horizontal method, the right-down diagonal method, and the DC method may be set to a high priority level, and the vertical method, the bi-linear method, and the plane method may be set to a low priority level. A final order is the horizontal method, the right-down diagonal method, the DC method, the vertical method, the bi-linear method, and the plane method.

Alternatively, when only two of the upper adjacent coding block, the left adjacent coding block, and the upper-left adjacent coding block use an intra-prediction mode and use the vertical method and the bi-linear method as an intra-prediction method, or the three neighboring blocks use an intra-prediction mode but use only two different methods from among the pre-determined intra-prediction methods, that is, the vertical method and the bi-linear method, the vertical method and the bi-linear method may be set to a high priority level, and the horizontal method, the right-down diagonal method, the DC method, and the plane method may be set to a low priority level. A final order may be the vertical method, the bi-linear method, the horizontal method, the right-down diagonal method, the DC method, and the plane method.

Alternatively, when only one of the upper adjacent coding block, the left adjacent coding block, and the upper-left coding block uses an intra-prediction mode and uses the vertical method as an intra-prediction method, or two or three of the neighboring blocks use an intra-coding mode but use only one pre-determined intra-prediction method that is the vertical method, the vertical method may be set to a high priority level, and the horizontal method, the right-down diagonal method, the bi-linear method, the DC method, and the plane method may be set to a low priority level. A final order may be the vertical method, the horizontal method, the right-down diagonal method, the bi-linear method, the DC method, and the plane method.

Alternatively, when none of the upper adjacent coding block, the left adjacent coding block, and the upper-left adjacent coding block use an intra-prediction mode having the pre-determined intra-prediction method of the intra-skip mode as an intra-prediction method, there may be no candidate intra-prediction method having a high priority level, and a final order may be the same as the pre-determined order, i.e., the vertical method, the horizontal method, the right-down diagonal method, the bi-linear method, the DC method, and the plane method.

In the present embodiment, index information indicating one of the candidate intra-prediction methods may be obtained by parsing a bitstream. The index information may further indicate whether the current block uses the intra-skip mode by using a predetermined index other than indices indicating the candidate intra-prediction methods, and it may be further determined whether the current block uses the intra-skip mode according to the index information obtained from the bitstream. For example, when an index value 0 may indicate that the intra-skip mode is not used, and an index d may indicate a candidate intra-prediction method A. The candidate intra-prediction method A indicated by the obtained index d may be determined as an intra-prediction method of the intra-skip mode of the current block. Decoding of the current block may be performed by using the determined intra-prediction method.

Although neighboring blocks are spatially adjacent blocks in embodiments 6 and 7, the neighboring blocks may be extended to temporally adjacent blocks and view-adjacent blocks, and the spatially adjacent blocks are not limited to a left adjacent block, an upper adjacent block, and an upper-left adjacent block.

Embodiment 8 provides a method of decoding a video.

In the present embodiment, n candidate intra-prediction methods are available for the intra-skip mode. An order of the n candidate intra-prediction methods may be pre-determined. For example, the pre-determined order in the present embodiment may be $x_1, x_2, \ldots,$ and $x_n$.

In the present embodiment, an intra-prediction method of the at least one neighboring block adjacent to the current block may be determined. An intra-prediction method of each of a left block, an upper block, an upper-right block that are spatially adjacent to the current block and a block located at the same spatial position as the current block in a temporally adjacent frame may be determined.

In the present embodiment, candidate intra-prediction methods of the intra-skip mode of the current block may be aligned. This procedure may be the same as that of embodiment 3, and a relation between indices and the candidate intra-prediction methods may be obtained.

All of the candidate intra-prediction methods may be aligned according to the intra-prediction method of the at least one neighboring block. When a left adjacent block, an upper adjacent block, an upper-right adjacent block, and a block located at the same spatial position as the current block in a temporally adjacent frame include an intra-coded block having one of the pre-determined candidate intra-prediction methods of the intra-skip mode in the present embodiment as a prediction method, a candidate intra-prediction method used by the at least one neighboring block may be set to a high priority level and the other candidate intra-prediction methods may be set to a low priority level. Candidate intra-prediction methods having the same priority level may be aligned according to the pre-determined order. For example, from among the candidate intra-prediction methods $x_1, x_2, \ldots,$ and $x_n$, prediction methods used by the upper adjacent block, the left adjacent block, the upper-right adjacent block, and the block located at the same spatial position as the current block in the temporally adjacent frame may include $x_i, x_j,$ and $x_k$. Then $x_i, x_j,$ and $x_k$ may be set to a high priority level, and the other prediction methods may be set to a low priority level. A final order may be $x_i, x_j, x_k, x_1, x_2, \ldots,$ and $x_n$.

In the present embodiment, index information indicating one of the candidate intra-prediction methods may be obtained by parsing a bitstream. Information indicating whether the current block uses the intra-skip mode may be obtained from the bitstream along with the index information, and the intra-skip mode of the current block may be first determined. An index d may indicate a candidate intra-prediction method A, and the candidate intra-prediction method A indicated by the obtained index d may be used as an intra-prediction method of the intra-skip mode of the current block. Decoding of the current block may be performed by using the determined intra-prediction method.

Embodiment 9 provides a method of decoding a video.

In the present embodiment, n candidate intra-prediction methods are available for the intra-skip mode. An order of the n candidate intra-prediction methods may be pre-determined. For example, the pre-determined order of the present embodiment may be $x_1, x_2, \ldots,$ and $x_n$.

In the present embodiment, an intra-prediction methods of the at least one neighboring block adjacent to the current block may be determined. For example, an intra-prediction method of each of a left adjacent block and an upper adjacent block that are in the same frame as the current block; a block located at the same spatial position as the current block in a temporally adjacent frame; and when the current block is in a dependent view image, a block located at the same spatial position as the current block in a base view image or a block located at a position shifted by a disparity vector from a position of the current block in the base view image may be determined.

In the present embodiment, candidate intra-prediction methods of the intra-skip mode of the current block may be aligned. This procedure may be the same as that of embodiment 4, and a relation between indices and the candidate intra-prediction methods may be obtained.

In the present embodiment, all of the candidate intra-prediction methods may be aligned according to the intra-prediction method of the at least one neighboring block. When a candidate intra-prediction method is used by the at least one neighboring block (i.e., when there is at least one neighboring block that uses an intra-prediction mode having the candidate intra-prediction method as an intra-prediction method), the candidate intra-prediction method may be set to a first priority level. When a candidate intra-prediction method is different from but similar to the intra-prediction method used by the at least one neighboring block, the candidate intra-prediction method may be set to a second priority level. The other candidate intra-prediction methods may be set to a third priority level.

Alternatively, a candidate intra-prediction method that is the same as the intra-prediction method of the at least one neighboring block and a candidate intra-prediction method that is similar to the intra-prediction method of the at least one neighboring block may be set to a first priority level, and the other candidate intra-prediction methods may be a second priority level. Candidate intra-prediction methods having the same priority level may be aligned according to the pre-determined order.

For example, when the at least one neighboring blocks includes a block using $x_l$ and $x_m$ as a prediction method, $x_l$ and $x_m$ may be set to a first priority level. Assuming that A and $x_o$ are adjacent angle prediction methods and B and $x_p$ are angle prediction methods with a distance of 1 therebetween, when the at least one neighboring block includes a block using A and B as an intra-prediction method, $x_o$ and $x_p$ may be set to a second priority level, and the other prediction methods may be set to a third priority level. Alternatively, $x_o$ may be set to a second priority level, $x_p$ may be set to a third priority level, and the others may be set to a fourth priority level. Alternatively, $x_l, x_m, x_o,$ and $x_p$ may all be set to a first priority level, and the others may be set to a second priority level. The pre-determined n candidate intra-prediction methods may be aligned in a descending order of priority levels, and prediction methods having the same priority level may be aligned according to the pre-determined order.

In the present embodiment, index information indicating one of the candidate intra-prediction methods may be obtained by parsing a bitstream. For example, an index d may indicate a candidate intra-prediction method A, and the candidate intra-prediction method A indicated by the obtained index d may be determined as an intra-prediction method of the intra-skip mode of the current block. Decoding of the current block may be performed by using the determined intra-prediction method.

Embodiment 10 provides a method of decoding a video.

In the present embodiment, n candidate intra-prediction methods are available for the intra-skip mode. An order of the n candidate intra-prediction methods may be pre-determined. For example, the pre-determined order of the present embodiment may be $x_1, x_2, \ldots,$ and $x_n$.

In operation 1202, a prediction method of the at least one neighboring block of the current block is determined. The at least one neighboring block may include a spatially adjacent block, a temporarily adjacent block, and a texture-depth adjacent block. An intra-prediction method of each of a left adjacent block and an upper adjacent block in the same frame as the current block, a block located at an upper-left corner of the current block, a block located at the center of the current block in a temporally adjacent frame, and a block at the same position as the current block in a texture image frame corresponding to a depth image frame when the current block is in the depth image frame may be determined.

In the present embodiment, candidate intra-prediction methods of the intra-skip mode of the current block may be aligned. This procedure may be the same as that of embodiment 5, and a relation between indices and the candidate intra-prediction methods may be obtained.

In the present embodiment, priority levels may be determined according to the number of neighboring blocks using the candidate intra-prediction methods of the intra-skip mode. A candidate intra-prediction method used by most neighboring blocks may be set to a highest priority level, a candidate intra-prediction method not used by any neighboring blocks may be set to a lowest priority level, and candidate intra-prediction methods having the same priority level may be aligned according to a pre-determined method. For example, when $x_l$ is used by three neighboring blocks, $x_m$ and $x_k$ are used by one neighboring block, and the other intra-prediction methods are not used by any neighboring blocks, $x_l$ may be set to a first priority level, $x_m$ and $x_k$ may be set to a second priority level, and the other intra-prediction methods may be set to a third priority level. $x_m$ and $x_k$ may be aligned according to the pre-determined order. A final order may be $x_l, x_m, x_k, x_2, \ldots,$ and $x_n$.

In the present embodiment, index information indicating one of the candidate intra-prediction methods may be obtained by parsing a bitstream. The index information may further indicate whether the current block uses the intra-skip mode by using a predetermined index other than indices indicating the candidate intra-prediction methods, and it may be further determined whether the current block uses the intra-skip mode according to the index information obtained from the bitstream. For example, when an index value 0 may indicate that the intra-skip mode is not used, and an index d may indicate a candidate intra-prediction method A. The candidate intra-prediction method A indicated by the obtained index d may be determined as an intra-prediction method of the intra-skip mode of the current block. Decoding of the current block may be performed by using the determined intra-prediction method.

The present disclosure also provides an encoding apparatus and a decoding apparatus for respectively performing the encoding method and the decoding method.

Figure 3:
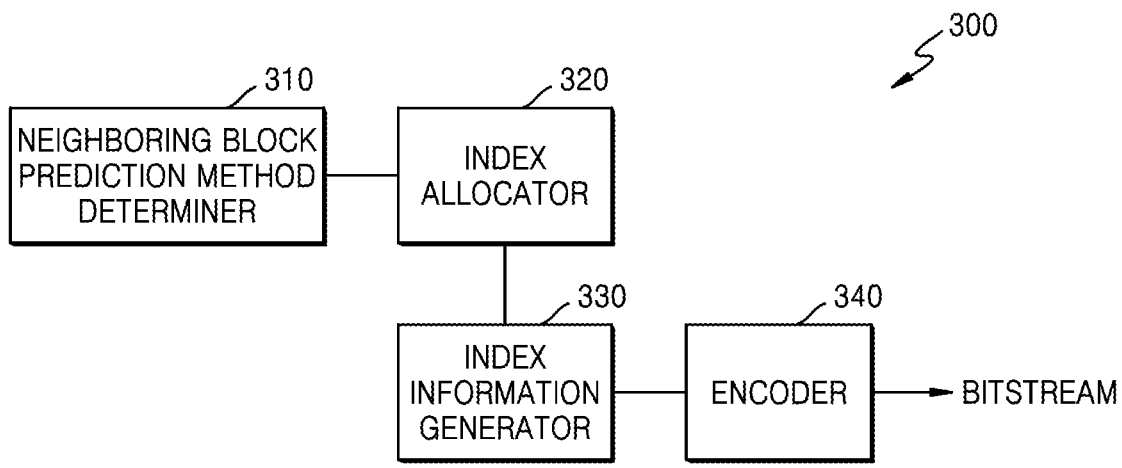
FIG. 3 is a block diagram of an apparatus for encoding a video according to an embodiment.

FIG. 3 is a block diagram of an apparatus 300 for encoding a video according to an embodiment.

As shown in FIG. 3, the encoding apparatus 300 of the present disclosure may include a neighboring block prediction method determiner 310, an index allocator 320, an index information generator 330, and an encoder 340.

The neighboring block prediction method determiner 310 may determine an intra-prediction method of at least one neighboring block adjacent to a current block that uses an intra-skip mode.

The index allocator 320 may determine priority levels of candidate intra-prediction methods of the intra-skip mode for the current block according to the intra-prediction method of the at least one neighboring block, may align the candidate intra-prediction methods according to the priority levels, and may allocate indices to the aligned candidate intra-prediction methods. According to an embodiment, a candidate intra-prediction method determined to have a higher probability to be used by the current block according to the intra-prediction method of the at least one neighboring block may be determined to have a higher priority level.

The index information generator 330 may determine an intra-prediction method of the current block, and may generate index information indicating the intra-prediction method of the current block from among the candidate intra-prediction methods according to the allocation of the indices.

The encoder 340 may encode the generated index information and may output a bitstream.

The encoding apparatus 300 of the present disclosure may perform, but is not limited to, a method of encoding a video of the present disclosure including embodiments 1 through 5.

Figure 4:
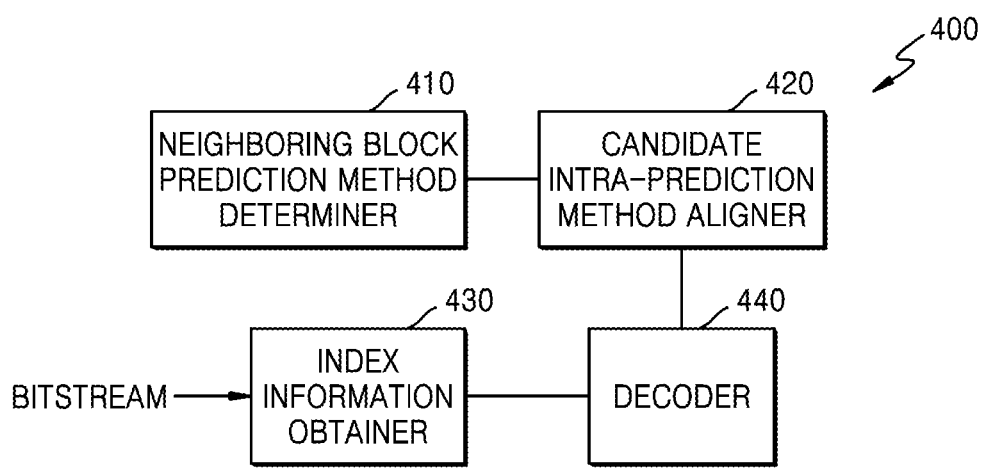
FIG. 4 is a block diagram of an apparatus for decoding a video according to an embodiment.

FIG. 4 is a block diagram of an apparatus 400 for decoding a video according to an embodiment.

As shown in FIG. 4, the decoding apparatus 400 of the preset disclosure may include a neighboring block prediction method determiner 410, a candidate intra-prediction method aligner 420, an index information obtainer 430, and a decoder 440.

The neighboring block prediction method determiner 410 may determine an intra-prediction method of at least one neighboring block adjacent to a current block that uses an intra-skip mode.

The candidate intra-prediction method aligner 420 may determine priority levels of candidate intra-prediction methods of the intra-skip mode for the current block according to the intra-prediction method of the at least one neighboring block, and may align the candidate intra-prediction methods according to the priority levels. According to an embodiment, a candidate intra-prediction method determined to have a higher probability to be used by the current block according to the intra-prediction method of the at least one neighboring block may be determined to have a higher priority level.

The index information obtainer 430 may obtain index information indicating one of the candidate intra-prediction methods from a bitstream.

The decoder 440 may determine a candidate intra-prediction method indicated by the obtained index information from among the aligned candidate intra-prediction methods as an intra-prediction method of the current block and may decode the current block by using the determined intra-prediction method.

The decoding apparatus 400 of the present disclosure may perform, but is not limited to, a method of decoding a video of the present disclosure including embodiments 6 through 10.

The encoding/decoding methods and the encoding/decoding apparatuses of the present disclosure may determine an intra-prediction method of an intra-skip mode of a current block by using an intra-prediction method of an intra-skip mode of at least one already encoded/decoded neighboring block adjacent to the current block. Spatially adjacent blocks, temporally adjacent blocks, view-adjacent blocks, and depth-texture adjacent blocks may be highly similar to each other, and may use very similar prediction methods. Accordingly, a prediction method used by an adjacent block is highly likely to be used by the current block. Therefore, the present disclosure may determine a probability that each candidate intra-prediction method is used by the current block according to the above prediction process, and may encode/decode a prediction method having a high probability by using a short codeword and may encode/decode a prediction method having a low probability by using a long codeword, thereby reducing an average length of codewords of the prediction methods. Thus, the present disclosure may dynamically adjust each intra-prediction method of the intra-skip mode and may provide an optimal coding scheme in real time to reduce the overhead of prediction method coding, thereby improving the efficiency of video coding.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method of decoding a video, the method comprising:
   determining intra-prediction methods of two neighboring blocks adjacent to a current block that uses an intra-skip mode;
   determining a list including a plurality of pre-determined candidate intra-prediction methods;
   when at least one of the intra-prediction methods of two neighboring blocks is identical to one of the pre-determined candidate intra-prediction methods, aligning the pre-determined candidate intra-prediction methods in the list, the list including the at least one of the intra-prediction methods of two neighboring blocks preceding another method among the pre-determined candidate intra-prediction methods;
   obtaining, from a bitstream, index information indicating one of the pre-determined candidate intra-prediction methods in the list;
   determining a candidate intra-prediction method indicated by the obtained index information from among the aligned pre-determined candidate intra-prediction methods in the list to be an intra-prediction method of the current block; and
   decoding the current block by using the determined intra-prediction method.

2. The method of claim 1,
   wherein codewords indicating the pre-determined candidate intra-prediction methods aligned in descending order in the list are arranged in an ascending order of codeword lengths.

3. The method of claim 1, wherein the aligning the pre-determined candidate intra-prediction methods in the list comprises determining that a candidate intra-prediction method not used by the two neighboring blocks and included in the pre-determined candidate intra-prediction methods in the list are preceded by the at least one of the intra-prediction methods used by the two neighboring blocks.

4. The method of claim 1, wherein the two neighboring blocks adjacent to the current block comprise a left block and an upper block from among blocks spatially adjacent to the current block, a block temporally adjacent to the current block, when the current block is in a dependent view frame, a block located at a same position as the current block in a base view frame corresponding to the dependent view frame, and when the current block is in a depth map frame, a block located at a same position as the current block in a texture frame corresponding to the depth map frame.

5. The method of claim 1, wherein a data unit of the current block is any one from among a largest coding unit, a largest coding block, a coding unit, a coding block, a prediction unit, a prediction block, a transform unit, and a transform block, and
   a data unit of the two neighboring blocks is any one from among a largest coding unit, a largest coding block, a coding unit, a coding block, a prediction unit, a prediction block, a transform unit, a transform block, a motion information storage unit, a motion information storage block, a prediction information storage unit, and a prediction information storage block.

6. An apparatus, implemented by at least one processor, for decoding a video, the apparatus comprising:
   a neighboring block prediction method determiner configured to determine intra-prediction methods of two neighboring blocks adjacent to a current block that uses an intra-skip mode;
   a candidate intra-prediction method aligner configured to determine a list including a plurality of pre-determined candidate intra-prediction methods, and, when at least one of the intra-prediction methods of two neighboring blocks is identical to one of the pre-determined candidate intra-prediction methods, align the pre-determined candidate intra-prediction methods in the list, the list including the at least one of the intra-prediction methods of two neighboring blocks preceding another method among the pre-determined candidate intra-prediction methods;
   an index information obtainer configured to obtain, from a bitstream, index information indicating one of the pre-determined candidate intra-prediction methods in the list; and
   a decoder configured to determine a candidate intra-prediction method indicated by the obtained index information from among the aligned pre-determined candidate intra-prediction methods in the list to be an intra-prediction method of the current block and decode the current block by using the determined intra-prediction method.

7. The apparatus of claim 6,
   wherein codewords indicating the pre-determined candidate intra-prediction methods aligned in a descending order in the list are arranged in an ascending order of codeword lengths.

8. The apparatus of claim 6, wherein the candidate intra-prediction method aligner is further configured to determine that a candidate intra-prediction method used by the two neighboring blocks and included in a pre-determined candidate intra-prediction methods in the list are preceded by the at least one of the intra-prediction methods used by the two neighboring blocks.

9. A method of encoding a video, the method comprising:
determining intra-prediction methods of two neighboring blocks adjacent to a current block that uses an intra-skip mode;
determining a list including a plurality of pre-determined candidate intra-prediction methods;
when at least one of the intra-prediction methods of two neighboring blocks is identical to one of pre-determined candidate intra-prediction methods, aligning the pre-determined candidate intra-prediction methods in the list, the list including the at least one of the intra-prediction methods of two neighboring blocks preceding another method among the pre-determined candidate intra-prediction methods, and allocating indices to the aligned pre-determined candidate intra-prediction methods in the list;
determining an intra-prediction method of the current block;
generating index information indicating the intra-prediction method of the current block from among the pre-determined candidate intra-prediction methods in the list according to the allocation of the indices; and
encoding the generated index information and outputting a bitstream.

* * * * *